US012581383B2

(12) United States Patent
Dong

(10) Patent No.: US 12,581,383 B2
(45) Date of Patent: Mar. 17, 2026

(54) CELL RESELECTION METHOD AND STORAGE MEDIUM

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 287 days.

(21) Appl. No.: 18/014,094

(22) PCT Filed: Aug. 19, 2020

(86) PCT No.: PCT/CN2020/110074
§ 371 (c)(1),
(2) Date: Dec. 30, 2022

(87) PCT Pub. No.: WO2022/036599
PCT Pub. Date: Feb. 24, 2022

(65) Prior Publication Data
US 2023/0262556 A1 Aug. 17, 2023

(51) Int. Cl.
*H04W 36/08* (2009.01)
*H04W 36/00* (2009.01)

(52) U.S. Cl.
CPC ..... *H04W 36/083* (2023.05); *H04W 36/0055* (2013.01)

(58) Field of Classification Search
CPC .............. H04W 36/083; H04W 48/18; H04W 36/0055; H04W 48/00; H04W 36/0022;

H04W 36/144; H04W 8/24; H04W 84/06; H04W 36/00222; H04W 36/00224; H04W 36/00226; H04W 36/0064; H04W 36/13
See application file for complete search history.

(56) References Cited

U.S. PATENT DOCUMENTS

| | | | |
|---|---|---|---|
| 11,963,049 B2 * | 4/2024 | Shi ......................... | H04W 48/12 |
| 2020/0404620 A1 | 12/2020 | Sang et al. | |

FOREIGN PATENT DOCUMENTS

| | | | |
|---|---|---|---|
| CN | 111132254 A | 5/2020 | |
| CN | 111294733 A | 6/2020 | |
| CN | 111294801 A | 6/2020 | |
| CN | 112437471 A | 3/2021 | |
| WO | 2019169359 A1 | 9/2019 | |
| WO | WO-2020150999 A1 * | 7/2020 | ........ H04W 74/0833 |

OTHER PUBLICATIONS

ZTE Corporation, Sanechips ("Consideration on system information and cell (re)selection in NTN", 3GPP TSG-RAN WG2 Meeting #111, R2-2006872, Aug. 17-18, 2020) (Year: 2020).*

(Continued)

*Primary Examiner* — Ji-Hae Yea
(74) *Attorney, Agent, or Firm* — Arch & Lake LLP; Hao Tan; Shen Wang

(57) ABSTRACT
Cell reselection methods, a terminal, a network equipment, and a non-transitory computer-readable storage medium are provided. The method includes: receiving indication information, where the indication information is configured to indicate the priorities of respective network types; and performing cell reselection based on the indication information.

9 Claims, 5 Drawing Sheets

(56)             References Cited

OTHER PUBLICATIONS

The First CNOA issued in Application No. 202080001841.8 dated Jan. 30, 2024 with English translation, (20p).

ZTE Corporation, Sanechips, "Consideration on system information and cell (re)selection in NTN," 3GPP TSG-RAN WG2 Meeting#111, R2-2006872, Electronic, Aug. 17-28, 2020, (6p).

CATT, "Cell Selection and Reselection Issue between NTN and TN System," 3GPP TSG-RAN WG2 Meeting #107bis R2-1912156, Chongqing, P.R.China, Oct. 14-18, 2019, (2p).

Huawei, HiSilicon, "Discussions on TA management and cell reselection in NTN," 3GPP TSG-RAN WG2 Meeting #107bis R2-1913175, Chongqing, China, Oct. 14-18, 2019, (6p).

LG Electronics Inc., "Report on email discussion [106#74][NTN] Cell Selection & reselection," 3GPP TSG-RAN WG2 Meeting #107 R2-1911297, Prague, Czech Republic, Aug. 26-30, 2019, (16p).

International Search Report of PCT/CN2020/110074 dated Apr. 30, 2021, with English translation, (4p).

Spreadtrum Communications, "Consideration on Cell Reselection Evaluation in NTN", 3GPP TSG-RAN WG2 Meeting #111-e, R2-2007048, Online, Aug. 17-28, 2020, (3p).

* cited by examiner

CELL RESELECTION METHOD AND STORAGE MEDIUM

CROSS-REFERENCE TO RELATED APPLICATION

The present application is the U.S. National phase application of International Application No. PCT/CN2020/110074, filed on Aug. 19, 2020, the entire content of which is incorporated herein by reference for all purposes.

TECHNICAL FIELD

The present disclosure relates to the field of communication technology and, in particular, to a cell reselection method, terminal, network equipment and computer-readable storage medium.

BACKGROUND

With the continuous development of communication technology, both Non-terrestrial networks (NTNs) and Terrestrial networks (TNs) need to provide services to terminal, so the terminal need to perform cell reselection within NTN and TN. Among them, NTNs include Geostationary Earth Orbiting (GEO) satellite networks, Low Earth Orbiting (LEO) satellite networks and Medium Earth Orbiting (MEO) satellite networks.

For the same network standard, if different network types (TN, GEO satellite network, LEO satellite network and MEO satellite network, etc.) correspond to different frequencies, the terminal can select the priority of the type of the network to be accessed according to the frequency priorities during cell reselection. However, when different network types correspond to the same frequency, the network cannot configure the terminal to reselect to a specific type of network during cell reselection, which is less flexible.

SUMMARY

The present disclosure provides a cell reselection method, terminal, network equipment, and a computer-readable storage medium.

In a first aspect, the present disclosure provides a cell reselection method, applied to terminal, the method including:

receiving indication information, the indication information being configured to indicate priorities of respective network types; and performing cell reselection based on the indication information.

In a second aspect, the present disclosure provides a cell reselection method, applied to network equipment, the method including:

sending indication information for terminal to perform cell reselection, the indication information being configured to indicate priorities of respective network types.

In a third aspect, the present disclosure provides a terminal, including a processor and a memory, the processor and the memory being interconnected.

The memory is configured to store a computer program.

The processor is configured to perform the method provided in the first aspect above when invoking the computer program.

In a fourth aspect, the present disclosure provides a network equipment, including a processor and a memory, the processor and the memory being interconnected.

The memory is configured to store a computer program.

The processor is configured to perform the method provided in the second aspect above when invoking the computer program.

In a fifth aspect, the present disclosure provides a non-transitory computer-readable storage medium that stores a computer program, the computer program being executed by a processor to implement the method provided in any embodiment of the first aspect and/or the second aspect described above.

BRIEF DESCRIPTION OF THE DRAWINGS

In order to more clearly illustrate the technical solutions in the embodiments of the present disclosure, the following is a brief description of the accompanying drawings to be used in the embodiments. It is obvious that the accompanying drawings in the following description are only some of the embodiments of the present disclosure, and other drawings can be obtained from these drawings without creative labor for those of ordinary skill in the art.

DETAILED DESCRIPTION

The technical solutions in the embodiments of the present disclosure will be clearly and completely described below in conjunction with the accompanying drawings in the embodiments of the present disclosure. Obviously, the embodiments described are only a part of the embodiments of the present disclosure, and not all of them. Based on the embodiments in the present disclosure, all other embodiments obtained by those of ordinary skill in the art without making creative labor fall within the scope of protection of the present disclosure.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

Figure 1:
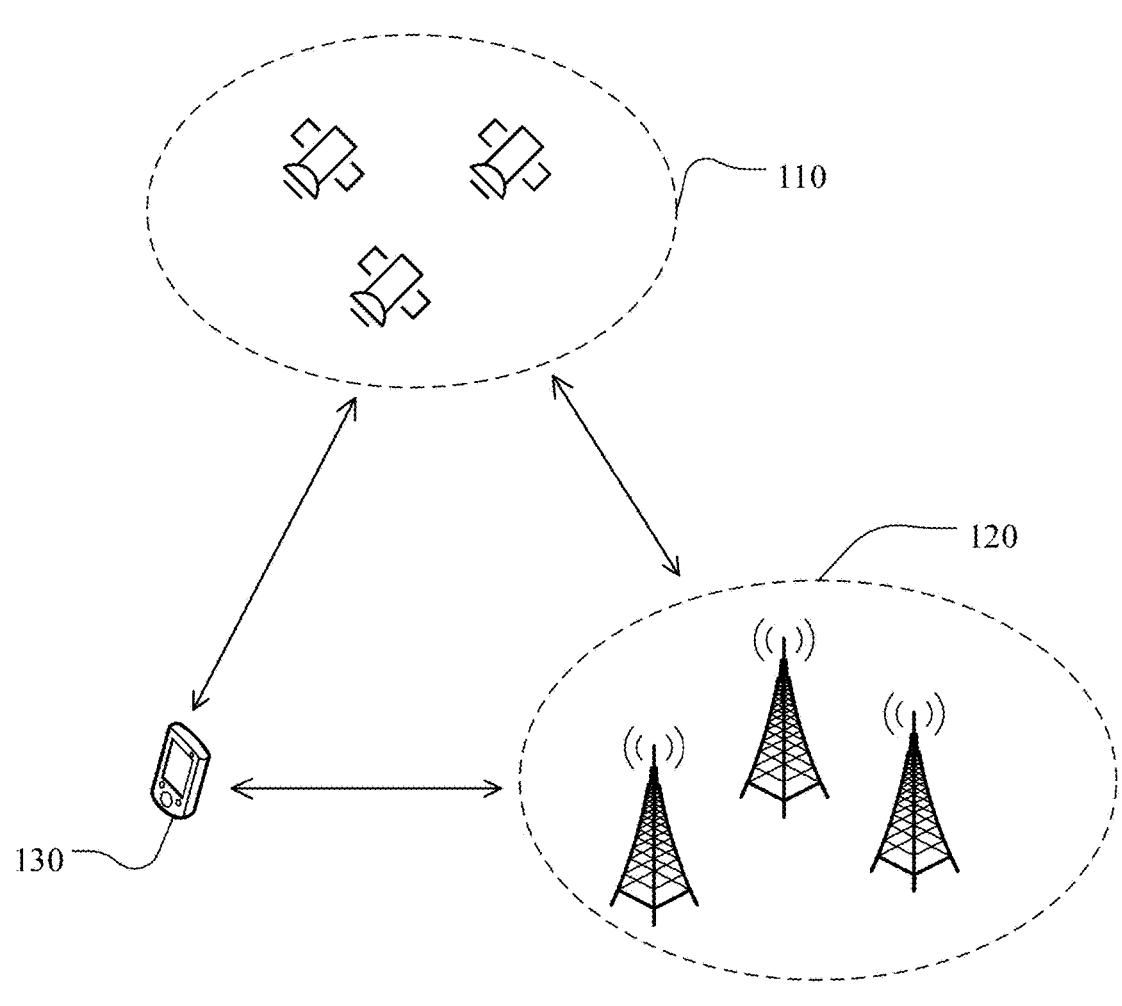
FIG. 1 is a diagram of a communication network architecture provided by embodiments of the present disclosure.

Referring to FIG. 1, FIG. 1 is a diagram of a communication network architecture provided by embodiments of the present disclosure. In FIG. 1, both NTN110 as well as TN120 may be included in the same network system, where NTN110 and TN120 may communicate with each other based on the needs of actual communication scenarios, and both NTN110 and TN120 may provide services for terminal 130. That is, the terminal 130 needs to select a cell to reside from one of the NTN110 and TN120 network types when performing cell reselection. Here, different network types such as GEO satellite network, LEO satellite network, and EO satellite network are included in NTN110. TN120 is composed of different network equipment on land.

The communication network architecture provided by embodiments of the present disclosure may be applicable to a variety of communication systems. For example, the system may be a global system of mobile communication (GSM) system, a code division multiple access (CDMA) system, a Wideband Code Division Multiple Access (WCDMA) system, a general packet radio service (GPRS) system, a long term evolution (LTE) system, an LTE frequency division duplex (FDD) system, an LTE time division duplex (TDD) system, a long term evolution advanced (LTE-A) system, a universal mobile telecommunication system (UMTS), a worldwide interoperability for microwave access (WiMAX) system, a 3rd generation partnership project (3GPP) related cellular system, a 5th generation (5G) mobile communication system, and the subsequent evolution of the communication system. Among them, 5G can also be called the new radio (NR).

The terminal 130 involved in embodiments of the present disclosure may be a device providing voice and/or data connectivity to a user, a handheld device with wireless connectivity, other processing device connected to a wireless modem, or devices such as a terminal in a future 5G system, a terminal device in a future evolved public land mobile network (PLMN), etc. In different systems, the name of the terminal may also be different. For example, in 5G systems, the terminal may be called User Equipment (UE). It can also be wireless terminal that can communicate with one or more Core Networks (CNs) via a Radio Access Network (RAN), which can be mobile terminal, such as a cell phone (or "cellular" phone) and a computer with mobile terminal, for example, a portable, pocket-sized, hand-held, computer-built or vehicle-mounted mobile equipment that exchange language and/or data with a wireless access network. For example, it can be a Personal Communication Service (PCS) telephone, a cordless phone, a Session Initiated Protocol (SIP) phone, a Wireless Local Loop (WLL) station, a Personal Digital Assistant (PDA), etc., which are not limited in the embodiments of the present disclosure. The wireless terminal may also be referred to as a system, subscriber unit, subscriber station, mobile station, mobile, remote station, access point, remote terminal, access terminal, user terminal, user agent, and user device, without limitation in the embodiments of the present disclosure.

The network equipment involved in TN120 in the embodiments of the present disclosure may be a base station, which may include a plurality of cells that provide service to the terminal. Depending on the specific application, the base station may also be referred to as an access point, or may be a device in an access network that communicates with wireless terminal over one or more sectors on an air interface, or may have other names. The network equipment may be used to interchange received air frames with Internet Protocol (IP) packets, acting as a router between the wireless terminal and the remainder of the access network, where the remainder of the access network may include the Internet Protocol (IP) communication network. The network equipment may also coordinate the management of the attributes of the air interface. For example, network equipment involved in embodiments of the present disclosure may be network equipment (Base Transceiver Station, BTS) in Global System for Mobile communications (GSM) or Code Division Multiple Access (CDMA) system, or network equipment (NodeB) in Wide-band Code Division Multiple Access (WCDMA) system. It may also be an evolutional Node B (eNB or e-NodeB) in a long term evolution (LTE) system, a 5G base station (gNB) in a 5G network architecture (next generation system), or a home evolved base station (Home evolved Node B, HNB), a relay node, Femto, a pico base station, etc., which are not limited in the embodiments of the present disclosure. In some network architectures, the network equipment may include centralized unit (CU) nodes and distributed unit (DU) nodes, and the centralized unit and distributed unit may also be arranged geographically separately.

In NTN110, the network equipment in different network types may include the network equipment involved in TN120, or other electronic devices, equipment, etc. having the same or similar functions as the network equipment in TN120, without limitation here.

Figure 2:
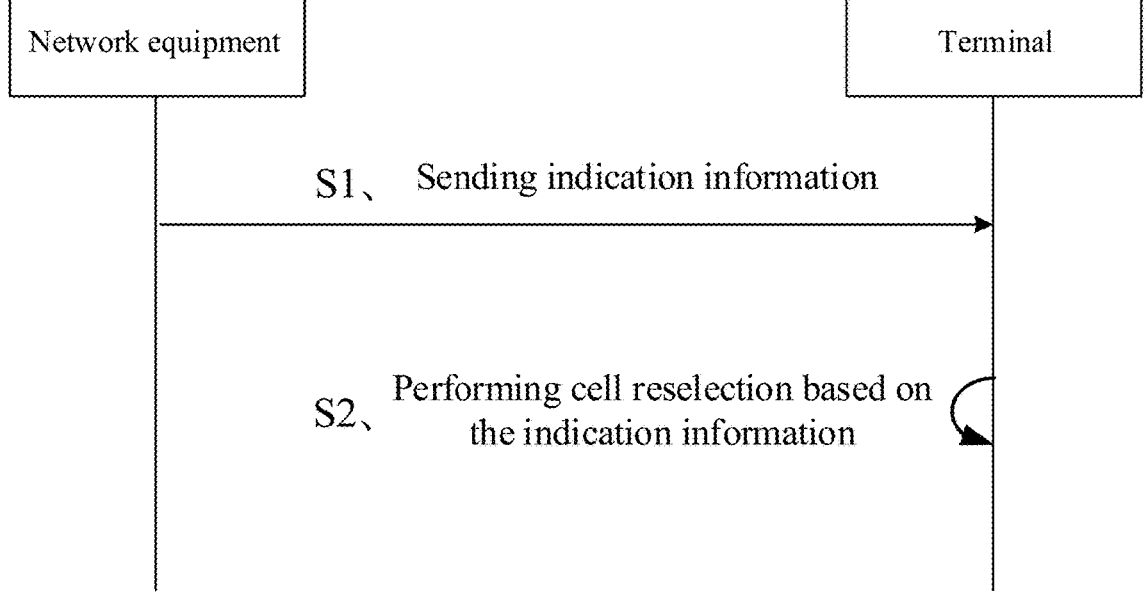
FIG. 2 is a schematic diagram of a timing sequence of a cell reselection method provided by embodiments of the present disclosure.

Referring to FIG. 2, FIG. 2 is a schematic diagram of a timing sequence of a cell reselection method provided by embodiments of the present disclosure. As shown in FIG. 2, the cell reselection method provided by the embodiments of the present disclosure may include the following steps S1 and S2.

S1, Sending Indication Information.

In some implementations, the indication information is used to indicate priorities of respective network types. The network types include at least one of: a GEO satellite network, a MEO satellite network, a LEO satellite network, or TN. The network equipment may acquire relevant information for determining the priorities for various types of networks. The relevant information for determining the priorities of the respective network types may include at least one of: report information of the terminal, capability information of the terminal, or a network configuration strategy. The network device further determines the priorities of the respective network types based on at least one of the report information of the terminal, the capability information of the terminal, or the network configuration strategy of each network type.

Multiple network types may correspond to the same priority at the same time, such as the GEO satellite network and the TN may correspond to the highest priority at the same time, or various network types may correspond to different priorities, respectively. The way of determining the priorities of the respective network types and the specific division of the granularity of the priorities can be determined based on the above relevant information and the actual application scenario, without limitation here.

Alternatively, the network equipment may, based on the report information of the terminal, determine one type of network in which the terminal expects to reside, and then determine the priorities of the respective network types based on the type of network in which the terminal expects to reside. The priority of the type of network in which the terminal expects to reside is higher than other types of networks. For example, the network device may determine the priority of TN as the highest priority if the network equipment determines through the report information that the terminal expects to reside in TN. The report information indicates the type of network in which the terminal expects to reside, and the network equipment may acquire the report information from the auxiliary information reported by the terminal to the network equipment, or may acquire the report information by a corresponding acquisition method based on the actual sending method of the terminal, without limitation here.

Further, the report information may also indicate a plurality of types of networks in which the terminal expects to reside, and an expected degree of each type of network in which the terminal expects to reside. The higher the expected degree, the more the terminal device expects to reside in the corresponding type of network. Thus, the network equipment may determine the priorities of the respective network types based on one or more types of networks in which the terminal expects to reside and the corresponding degree of expectation, and the higher the degree of expectation, the higher the priority of the corresponding type of network.

Alternatively, the network equipment may determine the priorities of the respective network types based on the capability information of the terminal. The capability information of the terminal may be relevant information characterizing the capability of the terminal, where the capability of the terminal may include Packet Data Convergence Protocol (PDCP) capability (e.g., type of compression header supported by the terminal), transmission channel capability (e.g., maximum transmission channel, receive bits, etc.) and measurement capability (e.g., multi-carrier frequency measurement), inter-system Packet Switch (PS) domain switching capability, Multimedia Broadcast Multicast Service (MBMS) reception capability, Carrier Aggregation (CA) capability, etc.

Among them, the capability information of the terminal may also include the band combination supported by the terminal, the modulation supported by the terminal on the carrier of these band combinations, the multiple-input multiple-output (MIMO) capability and related information of the corresponding wireless access technology of the terminal, such as the terminal supports one or more wireless technologies. The capability information of the terminal may also include the power level of the terminal (e.g., maximum output power) and the uplink and downlink service capability level (the number of bits of downlink shared channel transmission blocks that can be received per transmission time interval, the number of bits of each downlink shared channel transmission block that can be received per transmission time interval, and the number of bits of uplink and downlink shared channel transmission blocks that can be sent per transmission time interval), etc., without limitation here.

In particular, it should be noted that in the embodiments of the present disclosure, the capability information of the terminal may include one or more of the above information, which can be determined based on the actual application scenario and is not limited here.

Further, the network equipment may determine the priorities of the respective network types based on the specific content of the capability information. For example, the capability information of the terminal includes the maximum output power of the terminal, different output powers (or ranges) correspond to different priorities, and the higher the maximum output power of the terminal, the higher the corresponding priority. When the output power of terminal is higher, the priority of satellite network with higher orbit altitude (e.g., GEO satellite network) can be determined as the highest priority. When the maximum output power of terminal is lower, it is more power-efficient for the terminal to reside in the satellite network with lower orbital altitude (e.g., LEO satellite network), so the network equipment can determine the priority of LEO satellite network as the highest priority.

For another example, the capability information of the terminal includes the two modulation methods supported by the terminal, and the network equipment may determine the priority of the network type that supports both modulation methods as the highest priority, and the priority of the network type that does not support either of these modulation methods as the lowest priority. The priority of the network type that supports one of the modulation methods is determined as the middle priority.

In particular, it should be noted that the above way of determining the priority of the type of network is only an example and is not limited in the embodiments of the present disclosure.

Alternatively, the network equipment may determine the priorities of the respective network types based on the network configuration strategies of the respective network types. The network configuration strategy can be expressed as the types of devices that can access each type of network, the number of terminal accessed to each type of network, etc., which can be determined based on the actual application scenario and are not limited here.

For example, when the terminal is a cell phone, the network equipment may determine that the priority of TN is highest, or when the terminal is a vehicle navigation device, the network equipment may determine that the priority of the satellite network is highest. Further, for example, the network equipment determines the number of terminal currently accessed to each type of network, and the priority of the network type with fewer accessed terminal is determined to be the highest priority, i.e., the fewer the number of terminal accessed, the higher the priority of the corresponding network type.

In particular, it should be noted that the above network configuration strategy may include one or more configuration strategies. For example, the network equipment determines, based on one configuration strategy, the priorities of the respective network types, and then based on another configuration strategy to prioritize the network types with the same priority in the current priority, to obtain the final priority of the respective network types. The above way of determining the priorities of the respective network types based on the network configuration strategy is only an example, and the priorities of the respective network types can be determined based on the actual network configuration strategy, without limitation here.

Alternatively, the network equipment may also determine the priorities of the respective network types based on multiple of: the report information of the terminal, the capability information of the terminal, and the network configuration strategy. For example, the network equipment determines the priority of one type of network in which the terminal device expects to reside as the highest priority based on the report information of the terminal, and further determines the priority of each network type in the remaining network types based on the capability information of the terminal, and in the presence of multiple network types with the same priority, the network equipment prioritizes the network types with the same priority currently again based on the network configuration strategy.

In particular, the above specific way of determining the priorities of the respective network types based on one or more of: the report information of terminal, capability information of terminal and network configuration strategy, is only an example and can be determined based on actual application scenarios, and is not limited here.

In some implementations, the network equipment sends a system message including the above indication information to the terminal to enable the terminal to perform cell reselection based on the indication information. That is, the network equipment may carry the above indication information in the system message sent to the terminal, such as carrying the above indication information in the System Information Block (SIB) of the system message sent over the downlink shared channel, e.g., carrying the indication information in SIB2, SIB3.

Alternatively, the network equipment may also carry the above indication information in a Radio Resource Control (RRC) message sent to the terminal, such as in an RRC Release message.

In particular, it should be noted that the specific way of sending indication information from the network equipment to the terminal can be determined based on the actual application scenario as well as the communication network structure, and is not limited here.

S2, Performing Cell Reselection Based on the Indication Information.

In some implementations, the terminal may receive indication information for indicating the priorities of the respective network types based on the system message or RRC message sent by the network equipment, and then perform cell reselection based on the indication information.

Specifically, the terminal, after receiving the above indication information, may determine the priorities of the respective network types based on the indication information, and then determine a target cell for cell reselection based on the priorities of the respective network types, and S criteria and R criteria. That is, the terminal determines the cells selectable by the terminal based on the S criteria, and the target cell for cell reselection is determined from the cells selectable by the terminal based on the R criteria.

In some implementations, the terminal, after receiving the above indication information, may determine the priorities of the respective network types based on the indication information, and determine frequency priorities of the frequencies corresponding to the respective network types. In particular, the terminal may determine the frequency priorities of the frequencies corresponding to the respective network types based on the frequency priorities indicated by the network equipment. Alternatively, in the case where the network equipment does not indicate the frequency priorities of the frequencies corresponding to the respective network types, the terminal may determine the frequency priorities of the frequencies corresponding to the respective network types based on the frequencies corresponding to the respective network types.

The network equipment may, based on the above indication information, also indicate the frequency priorities of the frequencies corresponding to the respective network types, such that the terminal may determine the frequency priorities of the frequencies corresponding to the respective network types based on the above indication information. Alternatively, the network equipment may similarly send the frequency priority configuration information for indicating the frequencies corresponding to the respective network types to the terminal device by means of a system message or an RRC message, etc., such that the terminal may determine the frequency priorities of the frequencies corresponding to the respective network types based on the frequency priority configuration information.

Specifically, if the terminal determines that the frequency priorities of the frequencies corresponding to the respective network types are different, the terminal determines the target cell for cell reselection based on the frequency priorities of the frequencies corresponding to the respective network types, the S criteria, and the R criteria.

Specifically, if the terminal determines that the frequency priorities of the frequencies corresponding to the respective network types are the same, i.e., the frequencies corresponding to the respective network types all correspond to the same frequency priority, the terminal can determine the target cell for cell reselection based on the priorities of the respective network types, the above S criteria and the above R criteria.

Specifically, when the terminal determines the target cell for cell reselection based on the priorities of the respective network types, the S criteria, and the R criteria, the terminal may determine a cell that satisfies the S criteria and has a highest R value under the R criteria as the target cell for cell reselection based on the priorities of the respective network types.

That is, the terminal may determine the cells that satisfy the S criteria among the cells corresponding to all network types, and further determine the R value under the R criteria corresponding to each cell that satisfies the S criteria. The terminal may determine the cell with the highest R value under the R criteria as the target cell for cell reselection, and when multiple cells with the highest R value exist, the cell with the highest priority of the network type among the cells with the same R value is determined as the target cell for cell reselection.

Figure 3:
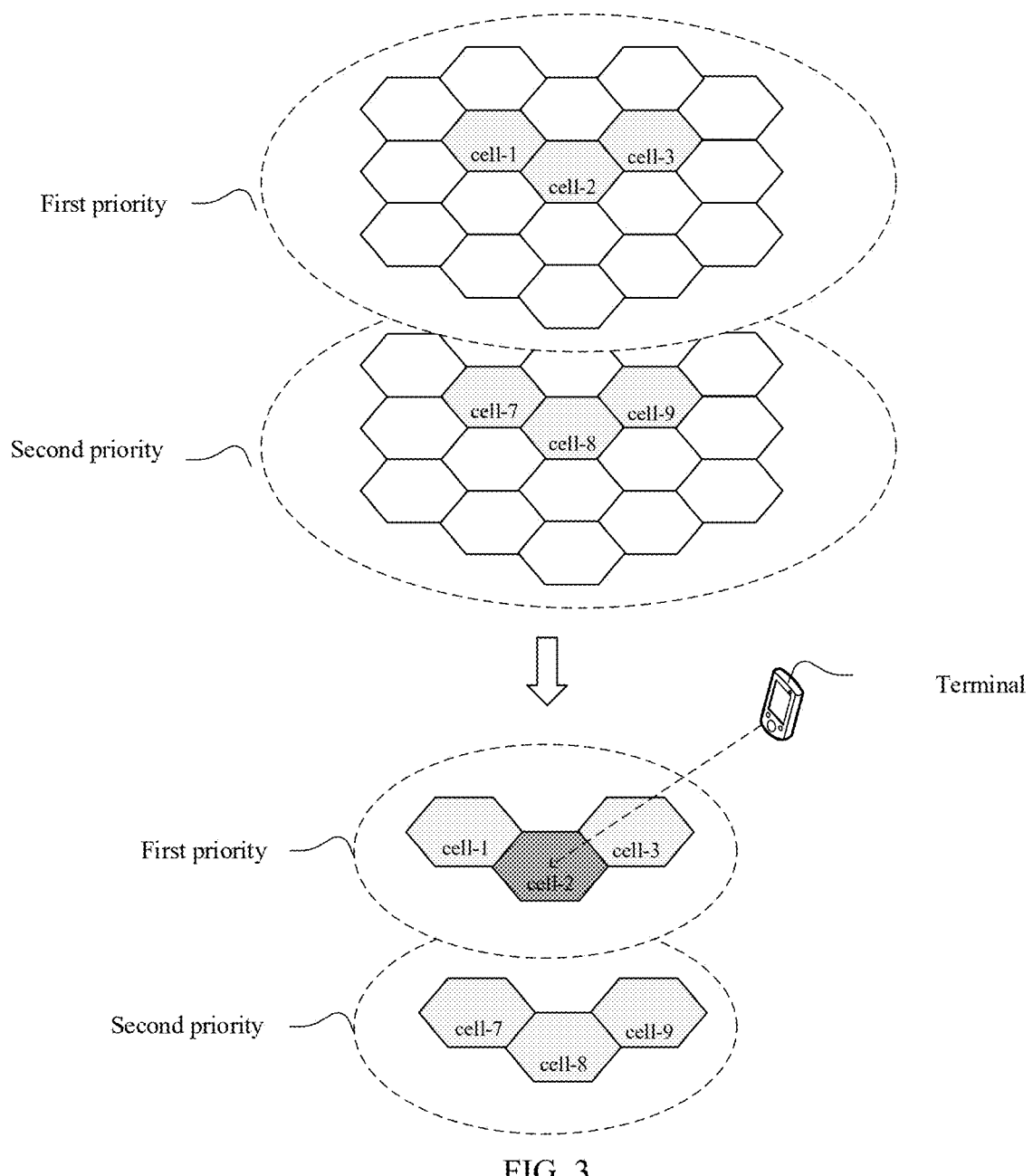
FIG. 3 is a schematic diagram of a scenario of cell reselection provided by embodiments of the present disclosure.

Referring to FIG. 3, FIG. 3 is a schematic diagram of a scenario of cell reselection provided by embodiments of the present disclosure. As shown in FIG. 3, the first priority is higher than the second priority, and the terminal determines the cells cell-1, cell-2, and cell-3 that satisfy the S criteria from the cells corresponding to the network type corresponding to the first priority. And, the terminal also determines the cells cell-7, cell-8, and cell-9 that satisfy the S criteria from the cells corresponding to the network type corresponding to the second priority. The terminal further determines the R values of cells cell-1, cell-2, cell-3, cell-7, cell-8, and cell-9 under the R criteria. When the R value of cell-2 is the highest value, the terminal may determine cell-2 as the target cell for cell reselection. When the R values of cell-2 and cell-9 are both the highest values, the terminal may determine cell-2 as the target call for cell reselection due to the priority of the network type corresponding to cell-2, which is higher than the priority of the network type corresponding to cell-9.

Alternatively, the terminal may determine at least one network type for which a cell exists that satisfies the S criteria, and further determine a network type with the highest priority among the at least one network type for which a cell exists that satisfies the S criteria. The terminal may determine a cell with the highest R value under the R criteria among all cells satisfying the S criteria in the network type with the highest priority as the target cell for cell reselection.

That is, the terminal identifies all cells that satisfy the S criteria in the network type corresponding to the first priority, and further determines, based on the R criteria, the corresponding R value of each cell among all cells that satisfy the S criteria. In this case, the terminal may determine the cell with the highest R value among the cells satisfying the S criteria as the target cell for cell reselection. If the terminal does not identify the cells satisfying the S criteria in the network type corresponding to the first priority, the cell with the highest R value among the cells satisfying the S criteria is determined as the target cell for cell reselection in the network type corresponding to the second priority based on the same manner. If the cells satisfying the S criteria are not identified in the network type corresponding to the second priority, the cells satisfying the S criteria are identified in the network type corresponding to the next priority based on the second priority until the target cell for cell reselection is identified based on the above manner. Here, the second priority is lower than the first priority.

Figure 4:
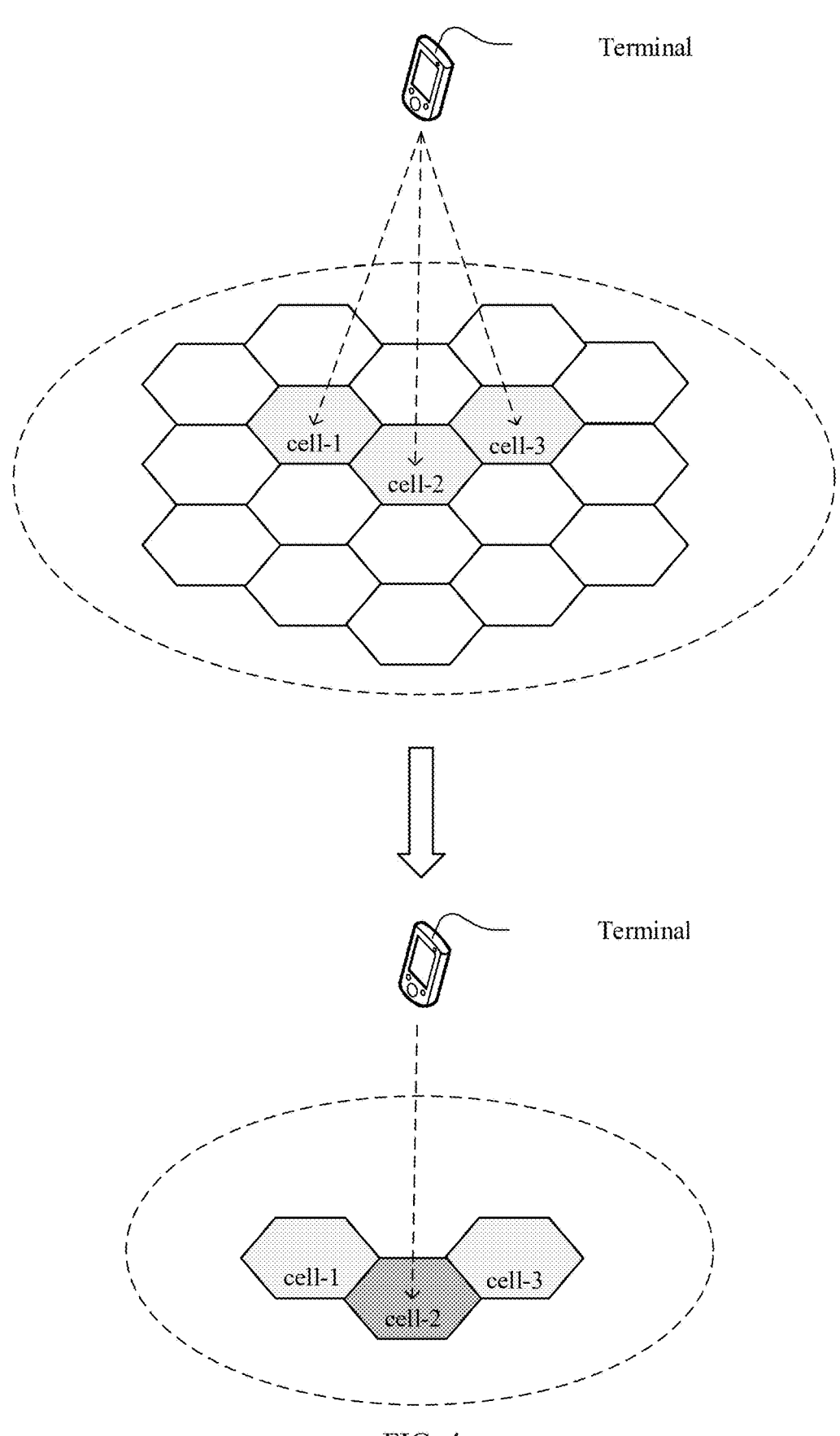
FIG. 4 is a schematic diagram of another scenario of cell reselection provided by embodiments of the present disclosure.

Referring to FIG. 4, FIG. 4 is a schematic diagram of another scenario of cell reselection provided by embodiments of the present disclosure. As shown in FIG. 4, when the terminal determines three cells, cell-1, cell-2, and cell-3, that satisfy the S criteria among multiple cells corresponding to the network type with the highest priority, the terminal will no longer perform cell reselection among cells corresponding to other network types with priority lower than the highest priority. In this case, the terminal determines the R values of cell-1, cell-2 and cell-3 corresponding to the R criteria, respectively, and if cell-2 has the largest R value, the terminal determines cell-2 as the target cell for cell reselection, i.e., the terminal device will access and reside in cell-2.

Alternatively, the terminal may determine, among the cells corresponding to all network types, the cells satisfying the S criteria, and further determine the R value under the R criteria corresponding to each cell satisfying the S criteria. The terminal determines the priority of the network type corresponding to each cell satisfying the S criteria, and determines the cell with the highest R value among one or more cells satisfying the S criteria corresponding to the network type with the highest priority as the target cell for cell reselection.

In some implementations, when performing cell reselection based on the priority of the network type, the S criteria and the R criteria, the terminal may first determine the network type supporting cell reselection in various network types, and then determine the target cell for cell reselection based on the network type supporting cell reselection and its priority, the S criteria and the R criteria. The conditions for determining the network type supporting cell reselection in various network types can be whether the access amount of terminal in the cell of the network type reaches the threshold value, whether the network type supports the access of the current terminal, etc., which can be determined based on the actual application scenario and are not limited here.

In some implementations, the terminal may determine the frequency priorities of the frequencies corresponding to the respective network types based on the frequencies of the respective network types if it does not receive the indication information for indicating the priorities of the respective network types, or determine the frequency priorities of the frequencies corresponding to the respective network types from the frequency priority configuration information sent by the network equipment, and then determine the target cell for cell reselection based on the frequency priority, the S criteria, and the R criteria. The network equipment determines the frequency priorities of the frequencies corresponding to the respective network types based on the frequencies corresponding to the respective network types, and sends the frequency priority configuration information to the terminal by means of a system message or an RRC message, etc., to indicate the frequency priorities of the frequencies corresponding to the respective network types by means of the frequency priority configuration information.

The specific implementation of the terminal based on the frequency priorities of the respective network types for cell reselection is the same as the implementation of the terminal based on the priority of the network type for cell reselection, and will not be repeated here.

In the embodiments of the present disclosure, the network equipment determines the priorities of respective network types by one or more of the report information of the terminal, the capability information of the terminal, and the network configuration strategy, which may enable the network equipment to determine the priorities of respective network types under different application scenarios with high applicability. In addition, the terminal can perform cell reselection based on the priorities of the respective network types when the frequency priority of each network type is the same, which further enhances the flexibility and applicability of cell reselection.

Figure 5:
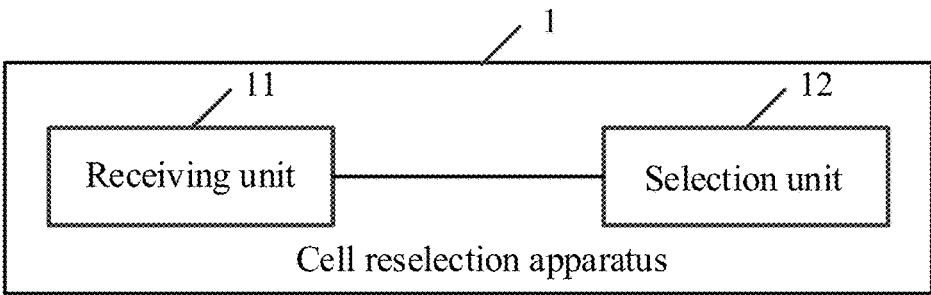
FIG. 5 is a schematic diagram of a structure of a cell reselection apparatus provided by embodiments of the present disclosure.

Referring to FIG. 5, FIG. 5 is a schematic diagram of a structure of a cell reselection apparatus provided by embodiments of the present disclosure. The cell reselection apparatus 1 provided by embodiments of the present disclosure includes:

a receiving unit 11, configured to receive indication information, the indication information being configured to indicate priorities of respective network types;

a selection unit 12, configured to perform cell reselection based on the indication information.

In some implementations, the network types include at least one of: a Geostationary Earth Orbiting (GEO) satellite network, a Medium Earth Orbiting (MEO) satellite network, a Low Earth Orbiting (LEO) satellite network, or a Terrestrial network (TN).

In some implementations, the selection unit 12 is configured to:

determine a target cell for cell reselection based on S criteria, R criteria, and the indication information.

In some implementations, the selection unit 12 is configured to:

determine the priorities of respective network types based on the indication information;

determine frequency priorities of frequencies corresponding to the respective network types; and determine, in response to the frequency priorities of the frequencies corresponding to the respective network types being equal, the target cell for cell reselection based on the priorities of the respective network types, the S criteria, and the R criteria.

In some implementations, the selection unit 12 is configured to:

determine, based on the priorities of the respective network types, a cell that satisfies the S criteria and has a highest R value under the R criteria as the target cell for cell reselection.

In some implementations, the selection unit 12 is configured to:

determine at least one network type for which a cell exists that satisfies the S criteria; and determine a cell with the highest R value under the R criteria that corresponds to a network type with a highest priority among the at least one network type, as the target cell for cell reselection.

In some implementations, the selection unit 12 is configured to:

determine, in response to the frequency priorities of the frequencies corresponding to the respective network types being different, the target cell for cell reselection based on the frequency priorities of the frequencies corresponding to the respective network types, the S criteria, and the R criteria.

In some implementations, the priorities are determined for the respective network types by at least one of following information:

report information of the terminal; capability information of the terminal; or a network configuration strategy;

where the report information indicates one type of network in which the terminal expects to reside.

In some implementations, the selection unit 12 is configured to:

receive a system message, the system message comprising the indication information; or receive a Radio Resource Control (RRC) message, the RRC message comprising the indication information.

Figure 6:
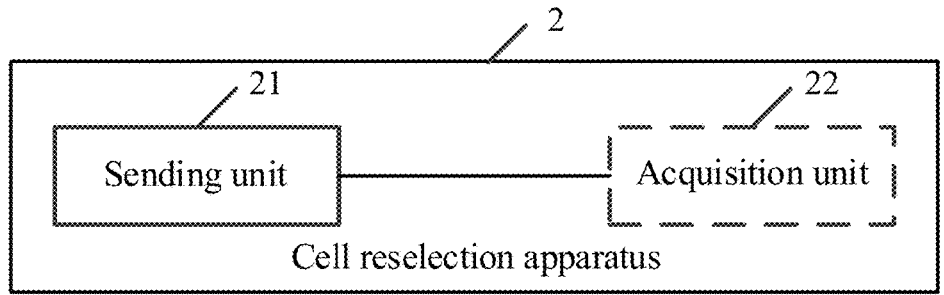
FIG. 6 is another schematic diagram of a structure of a cell reselection apparatus provided by embodiments of the present disclosure.

Referring to FIG. 6, FIG. 6 is another schematic diagram of a structure of a cell reselection apparatus provided by embodiments of the present disclosure. The cell reselection apparatus 2 provided by embodiments of the present disclosure includes:

a sending unit 21 configured to send indication information for terminal to perform cell reselection, the indication information being configured to indicate priorities of respective network types.

In some implementations, the network types comprise at least one of: a Geostationary Earth Orbiting (GEO) satellite network, a Medium Earth Orbiting (MEO) satellite network, a Low Earth Orbiting (LEO) satellite network, or a Terrestrial network (TN).

In some implementations, the cell reselection apparatus 2 further comprises an acquisition unit 22 configured to:

acquire relevant information for determining the priorities of the respective network types; and determine the priorities of the respective network types based on the relevant information;

where the relevant information comprises at least one of:

report information of the terminal; capability information of the terminal; or a network configuration strategy;

where the report information indicates one type of network in which the terminal expects to reside.

In some implementations, the sending unit 21 is configured to:

sending a system message comprising the indication information; or sending a Radio Resource Control (RRC) message comprising the indication information.

In the embodiments of the present disclosure, the network equipment determines the priorities of respective network types by one or more of the report information of the terminal, the capability information of the terminal, and the network configuration strategy, which may enable the network equipment to determine the priorities of respective network types under different application scenarios with high applicability. In addition, the terminal can perform cell reselection based on the priorities of the respective network types when the frequency priority of each network type is the same, which further enhances the flexibility and applicability of cell reselection.

Figure 7:
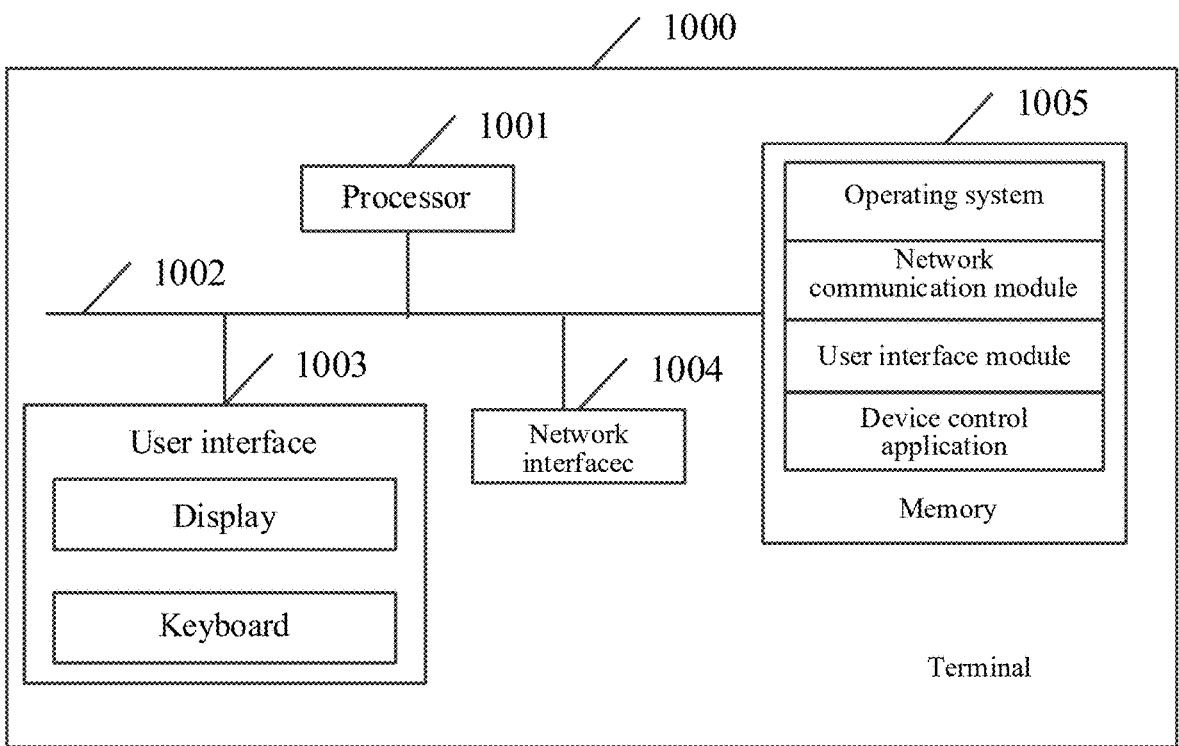
FIG. 7 is a schematic diagram of a structure of terminal provided by embodiments of the present disclosure.

Referring to FIG. 7, FIG. 7 is a schematic diagram of a structure of terminal provided by embodiments of the present disclosure. As shown in FIG. 7, the terminal 1000 in this embodiment may include: a processor 1001, a network interface 1004, and a memory 1005. In addition, the terminal apparatus 1000 may also include: a user interface 1003 and at least one communication bus 1002. The communication bus 1002 is configured to implement the connection communication between these components. Among them, the user interface 1003 can include a display, and a keyboard. Alternatively, the user interface 1003 can also include a standard wired interface, and wireless interface. Alternatively, the network interface 1004 can include a standard wired interface, and wireless interface (such as WI-FI interface). The memory 1004 can be high-speed RAM memory, or non-volatile memory, such as at least one disk memory. Alternatively, the memory 1005 may also be at least one storage device located away from the aforementioned processor 1001. As shown in FIG. 7, the memory 1005 as a computer-readable storage medium may include an operating system, a network communication module, a user interface module, and a device control application.

In the terminal apparatus 1000 shown in FIG. 7, the network interface 1004 may provide network communication functions, while the user interface 1003 is primarily configured to provide an interface for user input, and the processor 1001 may be configured to invoke the device control application stored in the memory 1005 to implement:

receiving indication information, the indication information being configured to indicate priorities of respective network types; and performing cell reselection based on the indication information.

In some implementations, the network types comprise at least one of: a Geostationary Earth Orbiting (GEO) satellite network, a Medium Earth Orbiting (MEO) satellite network, a Low Earth Orbiting (LEO) satellite network, or a Terrestrial network (TN).

In some implementations, the processor 1001 is configured to:

determine a target cell for cell reselection based on S criteria, R criteria, and the indication information.

In some implementations, the processor 1001 is configured to:

determine the priorities of respective network types based on the indication information;

determine frequency priorities of frequencies corresponding to the respective network types; and determine, in response to the frequency priorities of the frequencies corresponding to the respective network types being equal, the target cell for cell reselection based on the priorities of the respective network types, the S criteria, and the R criteria.

In some implementations, the processor 1001 is configured to:

determine, based on the priorities of the respective network types, a cell that satisfies the S criteria and has a highest R value under the R criteria as the target cell for cell reselection.

In some implementations, the processor 1001 is configured to:

determine at least one network type for which a cell exists that satisfies the S criteria; and determine a cell with the highest R value under the R criteria that corresponds to a network type with a highest priority among the at least one network type, as the target cell for cell reselection.

In some implementations, the processor 1001 is further configured to:

determine, in response to the frequency priorities of the frequencies corresponding to the respective network types being different, the target cell for cell reselection based on the frequency priorities of the frequencies corresponding to the respective network types, the S criteria, and the R criteria.

In some implementations, the priorities are determined for the respective network types by at least one of following information:

report information of the terminal; capability information of the terminal; or a network configuration strategy;

where the report information indicates one type of network in which the terminal expects to reside.

In some implementations, the processor 1001 is further configured to:

receiving a system message, the system message comprising the indication information; or receiving a Radio Resource Control (RRC) message, the RRC message comprising the indication information.

It should be understood that in some possible implementations, the processor 1001 may be a central processing unit (CPU), which may also be other general purpose processor, digital signal processor (DSP), application specific integrated circuit (ASIC), field-programmable gate array (FPGA) or other programmable logic device, discrete gate or transistor logic device, discrete hardware component, etc. The general purpose processor may be a microprocessor or the processor may also be any conventional processor, etc. The memory may include read-only memory and random access memory, and provides instructions and data to the processor. A portion of the memory may also include non-transitory random access memory. For example, the memory may also store information about the type of device.

Figure 8:
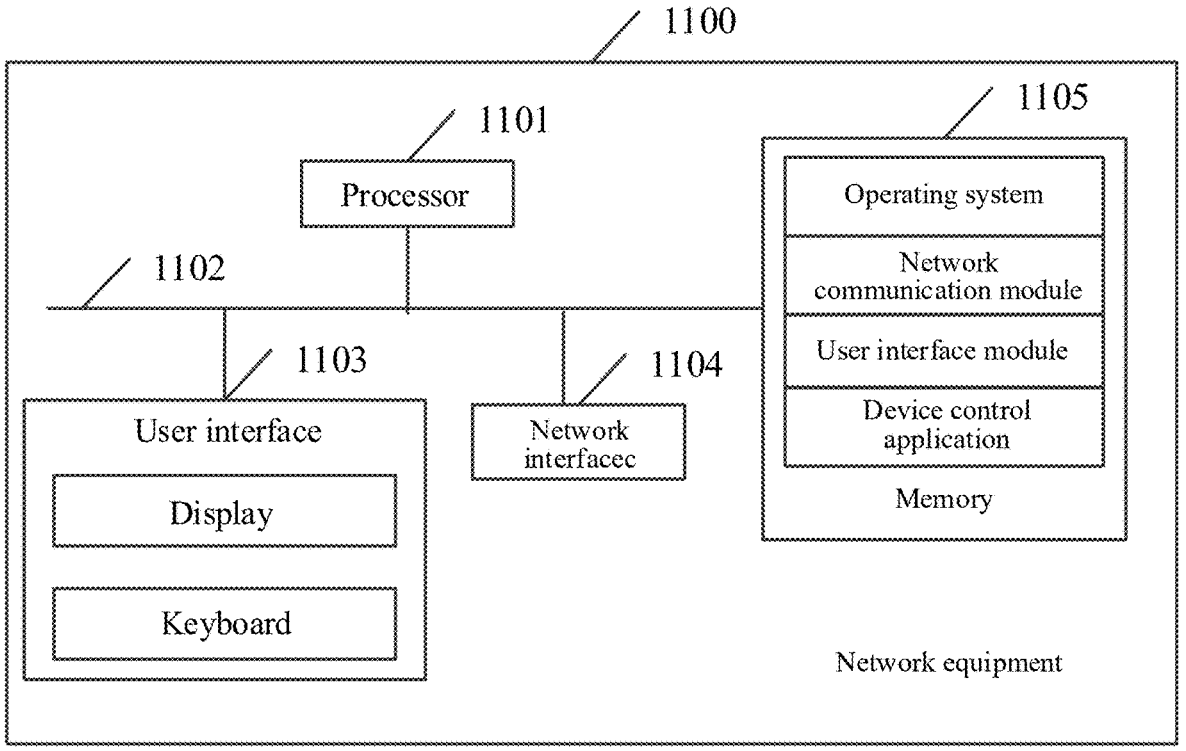
FIG. 8 is a schematic diagram of a structure of network equipment provided by embodiments of the present disclosure.

Referring to FIG. 8, FIG. 8 is a schematic diagram of a structure of network equipment provided by embodiments of the present disclosure. As shown in FIG. 8, the network equipment 1100 in this embodiment may include: a processor 1101, a network interface 1104, and a memory 1105. In addition, the network equipment 1100 may also include: a user interface 1103 and at least one communication bus 1102. The communication bus 1102 is configured to implement the connection communication between these components. Among them, the user interface 1103 can include a display and a keyboard. Alternatively, the user interface 1103 can also include a standard wired interface, and a wireless interface. Alternatively, the network interface 1104 can include a standard wired interface, and a wireless interface (such as WI-FI interface). The memory 1105 may be high-speed RAM memory, or non-volatile memory, such as at least one disk memory. Alternatively, the memory 1105 may also be at least one storage device located away from the aforementioned processor 1101. As shown in FIG. 8, the memory 1105 as a computer-readable storage medium may include an operating system, a network communication module, a user interface module, and a device control application.

In the network equipment 1100 shown in FIG. 8, the network interface 1104 may provide network communication functions, while the user interface 1103 is primarily configured to provide an interface for user input, and the processor 1101 may be configured to invoke the device control application stored in the memory 1105 to implement:

sending indication information for terminal to perform cell reselection, the indication information being configured to indicate priorities of respective network types.

In some implementations, the network types comprise at least one of: a Geostationary Earth Orbiting (GEO) satellite network, a Medium Earth Orbiting (MEO) satellite network, a Low Earth Orbiting (LEO) satellite network, or a Terrestrial network (TN).

In some implementations, the processor 1101 is further configured to:

acquiring relevant information for determining the priorities of the respective network types; and determining the priorities of the respective network types based on the relevant information;

where the relevant information comprises at least one of:

report information of the terminal; capability information of the terminal; or a network configuration strategy;

where the report information indicates one type of network in which the terminal expects to reside.

In some implementations, the processor 1101 is configured to:

send a system message comprising the indication information; or send a Radio Resource Control (RRC) message comprising the indication information.

It should be understood that in some possible implementations, the processor 1101 may be a central processing unit (CPU), which may also be other general purpose processor, digital signal processor (DSP), application specific integrated circuit (ASIC), field-programmable gate array (FPGA), or other programmable logic device, discrete gate or transistor logic device, discrete hardware component, etc. The general purpose processor may be a microprocessor or the processor may also be any conventional processor, etc. The memory may include read-only memory and random access memory, and provides instructions and data to the processor. A portion of the memory may also include non-transitory random access memory. For example, the memory may also store information about the type of device.

In the embodiments of the present disclosure, the network equipment determines the priorities of respective network types by one or more of the report information of the terminal, the capability information of the terminal, and the network configuration strategy, which may enable the network equipment to determine the priorities of respective network types under different application scenarios with high applicability. In addition, the terminal can perform cell reselection based on the priorities of the respective network types when the frequency priority of each network type is the same, which further enhances the flexibility and applicability of cell reselection.

The embodiments of the present disclosure also provide a computer-readable storage medium storing a computer program that is executed by a processor to implement the method provided in each of the steps of FIG. 2, as can be seen in the implementations provided in each of the above steps, which will not be repeated here.

The computer-readable storage medium described above may be an internal storage unit of the task processing device provided in any of the preceding embodiments, such as a hard disk or memory of the terminal or network equipment. The computer-readable storage medium may also be an external storage device of the terminal or network equipment, such as a plug-in hard disk, smart media card (SMC), secure digital (SD) card, flash card, etc. equipped on the terminal or network equipment. The above computer-readable storage medium may also include disks, optical disks, read-only memory (ROM) or random access memory (RAM), etc. Further, the computer-readable storage medium may also include both the internal storage unit of the terminal or the network equipment and the external storage device. The computer-readable storage medium is configured to store the computer program and other programs and data required by the terminal or network equipment. The computer-readable storage medium can also be configured to temporarily store the data that has been output or will be output.

The embodiments of the present disclosure provide a computer program product or computer program, the computer program product or computer program including computer instructions, the computer instructions being stored in a computer-readable storage medium. A processor of the terminal or network equipment reads the computer instructions from the computer-readable storage medium, and the processor executes the computer instructions such that the computer device performs the method provided in the various steps of FIG. 2.

The terms "first", "second", etc. in the claims and specification and accompanying drawings of the present disclosure are used to distinguish between different objects and are not intended to describe a particular order. In addition, the terms "includes" and "has" and any variations thereof are intended to cover non-exclusive inclusion. For example, a process, method, system, product, or electronic device that includes a series of steps or units is not limited to the listed steps or units, but alternatively also includes steps or units that are not listed, or alternatively also includes other steps or units that are inherent to those processes, methods, products, or electronic devices. References here to "embodiments/implementations" mean that particular features, structures, or characteristics described in connection with the embodiments may be included in at least one embodiment of the present disclosure. Presentation of the phrase in various places in the specification does not necessarily mean the same embodiment, nor is it a separate or alternative embodiment that is mutually exclusive with other embodiments. It is understood, both explicitly and implicitly, by those of skill in the art that the embodiments described here may be combined with other embodiments. The term "and/or" as used in this specification and the appended claims refers to any and all possible combinations of one or more of the items listed in connection therewith, and includes such combinations.

A person of ordinary skill in the art may realize that the units and algorithmic steps of each example described in conjunction with the embodiments disclosed here can be implemented with electronic hardware, computer software, or a combination of both, and that the composition and steps of each example have been described in the above description in general terms according to function in order to clearly illustrate the interchangeability of hardware and software. A skilled professional may use different methods to implement the described functions for each particular application, but such implementations should not be considered beyond the scope of this disclosure.

The above disclosures are only better embodiments of the present disclosure and cannot be used to limit the scope of the claims of the present disclosure. Therefore, equivalent variations made in accordance with the claims of the present disclosure are still covered by the present disclosure.

What is claimed is:

1. A cell reselection method, comprising:
receiving, by a terminal, indication information, the indication information being configured to indicate frequency priorities;
determining, by the terminal, the frequency priorities;
determining, by the terminal, in response to the frequency priorities being equal,
a cell with a highest priority of priorities of respective network types, among cells that satisfy S criteria and have a highest R value under R criteria, as a target cell for cell reselection, or
a cell with a highest R value under R criteria, among cells that satisfy S criteria and have a highest priority of the priorities of the respective network types, as a target cell for cell reselection, and
determining, by the terminal, in response to the frequency priorities being different, a target cell for cell reselection based on the frequency priorities of frequencies corresponding to the respective network types, the S criteria, and the R criteria,
wherein the priorities of the respective network types are determined by capability information of the terminal, wherein the capability information of the terminal comprises a maximum output power of the terminal, different maximum output powers correspond to different priorities, and a higher maximum output power of the terminal corresponds to a higher priority of a network type.

2. The method of claim 1, wherein the network types comprise at least one of following networks: a Geostationary Earth Orbiting (GEO) satellite network, a Medium Earth Orbiting (MEO) satellite network, a Low Earth Orbiting (LEO) satellite network, or a Terrestrial network (TN).

3. The method of claim 1, wherein receiving the indication information comprises any one of following steps:
receiving a system message comprising the indication information; or
receiving a Radio Resource Control (RRC) message comprising the indication information.

4. A Terminal, comprising a processor and a memory, the processor and the memory being interconnected, wherein
the memory is configured to store a computer program; and
the processor is configured to perform the method of claim 1 when invoking the computer program.

5. A non-transitory computer-readable storage medium, storing a computer program, wherein the computer program, when executed by a processor, causes the processor to implement the method of claim 1.

6. A cell reselection method, comprising:
acquiring, by a network equipment, relevant information for determining priorities of respective network types;
determining, by the network equipment, the priorities of the respective network types based on the relevant information; and
sending, by the network equipment, indication information, the indication information being configured to indicate the priorities of the respective network types;
wherein the indication information is configured for a terminal to determine frequency priorities, and in response to the frequency priorities being equal, to determine
a cell with a highest priority of the priorities of the respective network types, among cells that satisfy S criteria and have a highest R value under R criteria, as a target cell for cell reselection, or a cell with a highest R value under R criteria, among cells that satisfy S criteria and have a highest priority of the priorities of the respective network types, as a target cell for cell reselection, and in response to the frequency priorities being different, to determine a target cell for cell reselection based on the frequency priorities of frequencies corresponding to the respective network types, the S criteria, and the R criteria wherein the relevant information comprises capability information of the terminal, wherein the capability information of the terminal comprises a maximum output power of the terminal, different maximum output powers correspond to different priorities, and a higher maximum output power of the terminal corresponds to a higher priority of a network type.

7. The method of claim 6, wherein the network types comprise at least one of following networks: a Geostationary Earth Orbiting (GEO) satellite network, a Medium Earth Orbiting (MEO) satellite network, a Low Earth Orbiting (LEO) satellite network, or a Terrestrial network (TN).

8. The method of claim 6, wherein sending the indication information comprises any one of following steps:

sending a system message comprising the indication information; or sending a Radio Resource Control (RRC) message comprising the indication information.

9. A network equipment, comprising a processor and a memory, the processor and the memory being interconnected, wherein the memory is configured to store a computer program; and the processor is configured to perform the method of claim 6 when invoking the computer program.

* * * * *